United States Patent
Cheng et al.

(10) Patent No.: US 11,866,557 B2
(45) Date of Patent: Jan. 9, 2024

(54) COMPOSITE ARTICLES WITH REDUCED DISCOLORATION AND METHODS OF PROMOTING OR REDUCING COLOR CHANGES IN COMPOSITE ARTICLES

(71) Applicant: HANWHA AZDEL, INC., Forest, VA (US)

(72) Inventors: Peng Cheng, Forest, VA (US); Hongyu Chen, Forest, VA (US); Liqing Wei, Forest, VA (US); Ruomiao Wang, Forest, VA (US)

(73) Assignee: Hanwha Azdel, Inc., Forest, VA (US)

(*) Notice: Subject to any disclaimer, the term of this patent is extended or adjusted under 35 U.S.C. 154(b) by 340 days.

(21) Appl. No.: 16/932,747

(22) Filed: Jul. 18, 2020

(65) Prior Publication Data

US 2021/0130558 A1 May 6, 2021

Related U.S. Application Data

(60) Provisional application No. 62/875,891, filed on Jul. 18, 2019.

(51) Int. Cl.

| | |
|---|---|
| *C08J 5/10* | (2006.01) |
| *C08K 3/016* | (2018.01) |
| *C08J 5/04* | (2006.01) |
| *C08K 3/22* | (2006.01) |
| *C08K 5/00* | (2006.01) |
| *C08K 5/13* | (2006.01) |

(52) U.S. Cl.
CPC .............. *C08J 5/10* (2013.01); *C08J 5/043* (2013.01); *C08K 3/016* (2018.01); *C08K 3/22* (2013.01); *C08K 5/005* (2013.01); *C08K 5/13* (2013.01); *C08J 2323/06* (2013.01); *C08J 2323/12* (2013.01); *C08K 2003/2224* (2013.01); *C08K 2003/2227* (2013.01)

(58) Field of Classification Search
CPC ......... C08L 23/00; C08L 23/12; C08K 3/016; C08K 5/005; C08K 7/02; C08K 3/22; C08K 7/14

See application file for complete search history.

(56) References Cited

U.S. PATENT DOCUMENTS

| | | |
|---|---|---|
| 2002/0168503 A1 | 11/2002 | Dong |
| 2008/0248278 A1 | 10/2008 | Fisher |
| 2012/0058325 A1 | 3/2012 | Honma |
| 2017/0225429 A1* | 8/2017 | Yu .................. B32B 27/281 |

FOREIGN PATENT DOCUMENTS

| | | |
|---|---|---|
| WO | 199519391 | 7/1995 |
| WO | 2019136302 | 7/2019 |

OTHER PUBLICATIONS

Irganox® 1010 Datasheet (Year: 2013).*
ISR/WO for PCT/US2020/042693 dated Dec. 30, 2020.

* cited by examiner

*Primary Examiner* — Robert T Butcher
(74) *Attorney, Agent, or Firm* — Rhodes IP PLC; Christopher R Rhodes

(57) ABSTRACT

Composite articles that can resist discoloration or color changes are described. In some instances, the composite articles can include a compounded material that is substantially free of an antioxidant that changes from a first color to a second color upon exposure to an environment comprising an oxidizing agent. The composite articles can be flame retardant and may provide sound reduction as well.

10 Claims, 4 Drawing Sheets

COMPOSITE ARTICLES WITH REDUCED DISCOLORATION AND METHODS OF PROMOTING OR REDUCING COLOR CHANGES IN COMPOSITE ARTICLES

PRIORITY APPLICATION

This application is related to and claims priority to, and the benefit of, U.S. Application No. 62/875,891 filed on Jul. 18, 2019, the entire disclosure of which is hereby incorporated herein by reference for all purposes.

TECHNOLOGICAL FIELD

Certain embodiments are directed to composite article with reduced discoloration. In some examples, the composite articles may comprise one or more materials that deter a color change or promote a color change.

BACKGROUND

Composite articles have various different performance requirements depending on the end use of the composite articles. Environmental conditions or other factors can result in unwanted color changes in the composite articles.

SUMMARY

Certain aspects are described below for composite articles that can be designed to resist discoloration or promote a color change. The exact materials used in the composite article may vary depending on the desired color and end use of the articles.

In an aspect, a method of preventing color change of a flame retardant thermoplastic fiber-reinforced porous core upon exposure to an environment comprising oxidizing agent comprises producing the flame retardant thermoplastic fiber-reinforced porous core by combining reinforcing fibers, a first thermoplastic material, and a compounded material comprising a flame retardant compounded with a second thermoplastic material, wherein the flame retardant thermoplastic fiber-reinforced porous core comprises a web formed from the reinforcing fibers held in place by the first thermoplastic material and the second thermoplastic material, wherein the compounded material is substantially free of an antioxidant that switches from a first color to a second color upon exposure to the environment comprising the oxidizing agent.

In certain embodiments, the compounded material is substantially free of phenolic antioxidants. In other embodiments, the second thermoplastic material consists essentially of a polyolefin. In some examples, the polyolefin is polypropylene or polyethylene. In some configurations, the second thermoplastic material consists of a polyolefin. In additional examples, the polyolefin is polypropylene or polyethylene. In some examples, the flame retardant thermoplastic fiber-reinforced porous core layer is stored in the environment comprising the oxidizing agent for at least 24 hours without switching from the first color to the second color. In certain examples, the first thermoplastic material comprises a polyolefin. In other examples, the reinforcing fibers comprise glass fibers and the polyolefin of the first thermoplastic material comprises polypropylene. In additional embodiments, the flame retardant comprises magnesium hydroxide, aluminum hydroxide or both, wherein the second thermoplastic material comprises a polyolefin and wherein the flame retardant thermoplastic fiber-reinforced porous core meets ASTM E84, Class A specification.

In another aspect, a method of reducing color change of a flame retardant thermoplastic fiber-reinforced porous core comprises producing the flame retardant thermoplastic fiber-reinforced porous core by combining reinforcing fibers, a first thermoplastic material and a compounded material comprising a flame retardant compounded with a second thermoplastic material, wherein the flame retardant thermoplastic fiber-reinforced porous core comprises a web formed from the reinforcing fibers held in place by the first thermoplastic material and the second thermoplastic material, wherein the compounded material comprises an antioxidant that turns from a first color to a second color upon exposure to an environment comprising oxidizing agent present at a first concentration, and wherein the antioxidant turns from the second color back to the first color upon exposure to an environment comprising oxidizing agent present at a second concentration lower than the first concentration, and wherein the flame retardant thermoplastic fiber-reinforced porous core is stored in the environment comprising oxidizing agent present at or below the second concentration to maintain the flame retardant thermoplastic fiber-reinforced porous core at the first color.

In certain examples, the antioxidant comprises a phenolic antioxidant. In some embodiments, the first thermoplastic material consists essentially of a polyolefin. In certain examples, the polyolefin is polypropylene or polyethylene. In other embodiments, the first thermoplastic material consists of a polyolefin. In certain embodiments, the polyolefin is polypropylene or polyethylene. In other embodiments, the method comprises storing the flame retardant thermoplastic fiber-reinforced porous core layer in the environment comprising $NO_X$ present at the first concentration for at least 24 hours to turn the antioxidant in the flame retardant thermoplastic fiber-reinforced porous core from the first color to the second color. In some examples, the method comprises removing the flame retardant thermoplastic fiber-reinforced porous core layer from the environment comprising $NO_X$ present at the first concentration and storing the flame retardant thermoplastic fiber-reinforced porous core layer in the environment comprising $NO_X$ at or below the second concentration to turn the antioxidant in the flame retardant thermoplastic fiber-reinforced porous core from the second color to the first color. In some configurations, the first thermoplastic material comprises polypropylene and the reinforcing fibers comprise glass fibers. In other configurations, the flame retardant comprises magnesium hydroxide, aluminum hydroxide or both, wherein the second thermoplastic material comprises a polyolefin and wherein the flame retardant thermoplastic fiber-reinforced porous core meets ASTM E84, Class A specification.

In an additional aspect, a method of preventing a color change of a flame retardant thermoplastic fiber-reinforced porous core comprising a compounded material comprising an antioxidant is described. In certain embodiments, the method comprises shielding the flame retardant thermoplastic fiber-reinforced porous core from exposure to oxidizing agent in an environment surrounding the flame retardant thermoplastic fiber-reinforced porous core to prevent the antioxidant from changing from a first color to a second color upon exposure to the environment comprising the oxidizing agent.

In certain examples, the shielding comprises wrapping the flame retardant thermoplastic fiber-reinforced porous core with a material to prevent the oxidizing agent from reacting with the antioxidant in the flame retardant thermoplastic fiber-reinforced porous core. In other examples, the shielding comprises packaging the flame retardant thermoplastic fiber-reinforced porous core in a substantially air tight container to prevent the oxidizing agent from reacting with the antioxidant in the flame retardant thermoplastic fiber-reinforced porous core. In some embodiments, the flame retardant thermoplastic fiber-reinforced porous core comprises a web formed from the reinforcing fibers held in place by the thermoplastic material, and wherein the porous core comprises a coating on a first surface to prevent the oxidizing agent from diffusing into the porous core. In other embodiments, the flame retardant thermoplastic fiber-reinforced porous core comprises a web formed from the reinforcing fibers held in place by the thermoplastic material and wherein the porous core is sealed at each surface to prevent the oxidizing agent from diffusing into the porous core. In certain embodiments, a thermoplastic material of the flame retardant thermoplastic fiber-reinforced porous core comprises a polyolefin. In some instances, the polyolefin comprises polypropylene. In other examples, the antioxidant is a phenolic antioxidant. In some embodiments, reinforcing fibers of the thermoplastic fiber-reinforced porous core comprise glass fibers. In certain examples, the flame retardant fiber-reinforced thermoplastic porous core comprises magnesium hydroxide, aluminum hydroxide or both, wherein the second thermoplastic material comprises a polyolefin and wherein the flame retardant thermoplastic fiber-reinforced porous core meets ASTM E84, Class A specification.

In another aspect, a method of altering the color of a flame retardant thermoplastic fiber-reinforced porous core is described. In certain embodiments, the method comprises forming the flame retardant thermoplastic fiber-reinforced porous core by combining reinforcing fibers, a first thermoplastic material and a compounded material comprising a flame retardant, an antioxidant and a second thermoplastic material to form a web, and exposing the formed web to an environment comprising oxidizing agent to alter the color of the antioxidant in the flame retardant thermoplastic fiber-reinforced porous core layer from a first color to a second color.

In certain configurations, the web is exposed to the environment comprising the oxidizing agent prior to compressing of the web. In other examples, the web is exposed to the environment comprising the oxidizing agent after compressing of the web. In some embodiments, the web is exposed to the environment comprising greater than 2 ppm oxidizing agent prior to disposing a skin on the web. In certain instances, the web is exposed to the environment comprising greater than 2 ppm oxidizing agent after disposing a porous skin on the web. In other embodiments, the first thermoplastic material of the flame retardant thermoplastic fiber-reinforced porous core comprises a polyolefin. In some examples, the polyolefin comprises polypropylene. In other examples, the antioxidant is a phenolic antioxidant. In certain embodiments, reinforcing fibers of the thermoplastic fiber-reinforced porous core comprises glass fibers. In some examples, the flame retardant comprises magnesium hydroxide, aluminum hydroxide or both, wherein the second thermoplastic material comprises a polyolefin and wherein the flame retardant thermoplastic fiber-reinforced porous core meets ASTM E84, Class A specification.

In an additional aspect, a thermoplastic composite article comprises a porous core comprising reinforcing fibers, a first thermoplastic material and a compounded material comprising a flame retardant and a second thermoplastic material, wherein the compounded material is substantially free of antioxidants that turn color upon exposure to oxidizing agent, and wherein the porous core comprises a web formed from the reinforcing fibers held in place by the first thermoplastic material and the second thermoplastic material.

In certain examples, the second thermoplastic material consists essentially of a polyolefin. In some embodiments, the polyolefin is polypropylene or polyethylene. In other embodiments, the second thermoplastic material consists of a polyolefin. In some instances, the polyolefin is polypropylene or polyethylene. In other embodiments, the flame retardant comprises magnesium hydroxide, aluminum hydroxide or both, wherein the second thermoplastic material comprises a polyolefin and wherein the flame retardant thermoplastic fiber-reinforced porous core meets ASTM E84, Class A specification. In certain examples, the reinforcing fibers comprise glass fibers and the polyolefin comprises polypropylene. In other examples, the composite further comprises a first skin disposed on a first surface of the porous core. In certain examples, the compounded material is free of any phenolic antioxidants. In other examples, the composite comprises a non-phenolic antioxidant in the porous core.

In another aspect, a thermoplastic composite article comprises a porous core comprising reinforcing fibers, a compounded material and a first thermoplastic material comprising an antioxidant, wherein the compounded material comprises a metal hydroxide flame retardant and a second thermoplastic material, wherein the compounded material is free of any phenolic antioxidants, and wherein the porous core comprises a web formed from the reinforcing fibers held in place by the first thermoplastic material and the second thermoplastic material.

In certain embodiments, each of the first thermoplastic material and the second thermoplastic material comprises a polyolefin. In other embodiments, the reinforcing fibers comprise glass fibers. In some examples, the metal hydroxide flame retardant comprises magnesium hydroxide, aluminum hydroxide or both. In other examples, the antioxidant present in the first thermoplastic material comprises a phenolic antioxidant, each of the first thermoplastic material and the second thermoplastic material comprises polypropylene, the reinforcing fibers comprise glass fibers and the metal hydroxide flame retardant comprises magnesium hydroxide. In some embodiments, the phenolic antioxidant turns pink upon exposure to the oxidizing agent. In certain embodiments, the antioxidant present in the first thermoplastic material comprises a phenolic antioxidant, each of the first thermoplastic material and the second thermoplastic material comprises polypropylene, the reinforcing fibers comprise glass fibers and the metal hydroxide flame retardant comprises aluminum hydroxide. In certain examples, the phenolic antioxidant turns pink upon exposure to the oxidizing agent. In some embodiments, the article comprises a first skin disposed on a first surface of the porous core and an optional second skin disposed on a second surface of the porous core. In some examples, the article comprises an additive that reacts with the antioxidant or oxidizing agent to prevent a color change in the porous core.

In another aspect, a thermoplastic composite article comprises a porous core comprising reinforcing fibers, a first thermoplastic material comprising a polyolefin and an antioxidant, and a compounded material comprising a flame retardant and a second thermoplastic material, wherein the compounded material is substantially free of antioxidants that turn color upon exposure to oxidizing agent, wherein the porous core comprises a web formed from the reinforcing fibers held in place by the first thermoplastic material and the second thermoplastic material, and wherein the porous core meets ASTM E84, Class A specification.

In an additional aspect, a thermoplastic composite article comprises a porous core comprising reinforcing fibers, a first thermoplastic material comprising a polyolefin and an antioxidant, and a compounded material comprising a flame retardant and a second thermoplastic material, wherein the compounded material is substantially free of antioxidants that turn color upon exposure to oxidizing agent, wherein the porous core comprises a web formed from the reinforcing fibers held in place by the first thermoplastic material and the second thermoplastic material, and wherein the porous core comprises a sound absorption coefficient of at least 0.25 or at least 0.4 or at least 0.5 as tested by ASTM C423-17.

In another aspect, a thermoplastic composite article comprises a porous core comprising reinforcing fibers, a first thermoplastic material comprising a polyolefin and an antioxidant, and a compounded material comprising a flame retardant and a second thermoplastic material, wherein the compounded material is substantially free of antioxidants that turn color upon exposure to oxidizing agent, wherein the porous core comprises a web formed from the reinforcing fibers held in place by the first thermoplastic material and the second thermoplastic material, and wherein the porous core comprises a sound absorption coefficient of at least 0.25 or at least 0.4 or at least 0.5 as tested by ASTM C423-17 and meets ASTM E84, Class A specification.

In an additional aspect, a thermoplastic composite article comprises a porous core comprising reinforcing fibers, a first thermoplastic material comprising a polyolefin and an antioxidant, and a compounded material comprising a flame retardant and a second thermoplastic material, wherein the compounded material is substantially free of antioxidants that turn color upon exposure to oxidizing agent, wherein the porous core comprises a web formed from the reinforcing fibers held in place by the first thermoplastic material and the second thermoplastic material, and wherein the porous core comprises a sound absorption coefficient of at least 0.25 or at least 0.4 or at least 0.5 as tested by ASTM C423-17, meets ASTM E84, Class A specification and provides a substantially constant discoloration value (Delta E) as tested for 72 hours using Test Method AATCC 23 dated 2015.

In another aspect, a method of preventing color change of a flame retardant thermoplastic fiber-reinforced porous core upon exposure to an environment comprising an oxidizing agent comprises producing the flame retardant thermoplastic fiber-reinforced porous core by combining reinforcing fibers, a flame retardant and a thermoplastic material to form a web comprising the reinforcing fibers held in place by the thermoplastic material, wherein the thermoplastic material is substantially free of an antioxidant that switches from a first color to a second color upon exposure to the environment comprising the oxidizing agent.

In certain embodiments, the thermoplastic material is substantially free of phenolic antioxidants. In other embodiments, the thermoplastic material consists essentially of a polyolefin. In some examples, the polyolefin is polypropylene or polyethylene. In other embodiments, the thermoplastic material consists of a polyolefin. In some examples, the polyolefin is polypropylene or polyethylene. In other examples, the flame retardant thermoplastic fiber-reinforced porous core layer is stored in the environment comprising the oxidizing agent for at least 24 hours without switching from the first color to the second color. In some examples, the thermoplastic material comprises a polyolefin. In other examples, the reinforcing fibers comprise glass fibers and the polyolefin comprises polypropylene. In some configurations, the flame retardant comprises magnesium hydroxide, aluminum hydroxide or both and wherein the flame retardant thermoplastic fiber-reinforced porous core meets ASTM E84, Class A specification.

In another aspect, a method of reducing color change of a flame retardant thermoplastic fiber-reinforced porous core comprises producing the flame retardant thermoplastic fiber-reinforced porous core by combining reinforcing fibers, a flame retardant and a thermoplastic material to form a web comprising the reinforcing fibers held in place by the thermoplastic material, wherein the thermoplastic material comprises an antioxidant that turns from a first color to a second color upon exposure to an environment comprising oxidizing agent present at a first concentration, and wherein the antioxidant turns from the second color back to the first color upon exposure to an environment comprising oxidizing agent present at a second concentration lower than the first concentration, and wherein the flame retardant thermoplastic fiber-reinforced porous core is stored in the environment comprising oxidizing agent present at or below the second concentration to maintain the flame retardant thermoplastic fiber-reinforced porous core at the first color.

In certain embodiments, the antioxidant comprises a phenolic antioxidant. In other embodiments, the thermoplastic material consists essentially of a polyolefin. In some examples, the polyolefin is polypropylene or polyethylene. In additional examples, the thermoplastic material consists of a polyolefin. In some examples, the polyolefin is polypropylene or polyethylene. In certain embodiments, the method comprises storing the flame retardant thermoplastic fiber-reinforced porous core layer in the environment comprising the oxidizing agent present at the first concentration for at least 24 hours to turn the antioxidant from the first color to the second color. In some embodiments, the method comprises removing the flame retardant thermoplastic fiber-reinforced porous core layer from the environment comprising the oxidizing agent present at the first concentration and storing the flame retardant thermoplastic fiber-reinforced porous core layer in the environment comprising the oxidizing agent at or below the second concentration to turn the antioxidant from the second color to the first color. In some instances, the thermoplastic material comprises polypropylene and the reinforcing fibers comprise glass fibers. In other examples, the flame retardant comprises magnesium hydroxide, aluminum hydroxide or both and wherein the flame retardant thermoplastic fiber-reinforced porous core meets ASTM E84, Class A specification.

In an additional aspect, a method of preventing a color change of a flame retardant thermoplastic fiber-reinforced porous core comprising an antioxidant is described. In some embodiments, the method comprises shielding the flame retardant thermoplastic fiber-reinforced porous core from exposure to oxidizing agent in an environment surrounding the flame retardant thermoplastic fiber-reinforced porous core to prevent the antioxidant from changing from a first color to a second color upon exposure to the environment comprising the oxidizing agent.

In certain examples, the shielding comprises wrapping the flame retardant thermoplastic fiber-reinforced porous core with a material to prevent the oxidizing agent from reacting with the antioxidant in the flame retardant thermoplastic fiber-reinforced porous core. In other examples, the shielding comprises packaging the flame retardant thermoplastic fiber-reinforced porous core in a substantially air tight container to prevent the oxidizing agent from reacting with the antioxidant in the flame retardant thermoplastic fiber-reinforced porous core. In some embodiments, the flame retardant thermoplastic fiber-reinforced porous core comprises a web formed from the reinforcing fibers held in place by the thermoplastic material, and wherein the porous core comprises a coating on a first surface to prevent the oxidizing agent from diffusing into the porous core. In certain embodiments, the flame retardant thermoplastic fiber-reinforced porous core comprises a web formed from the reinforcing fibers held in place by the thermoplastic material and wherein the porous core is sealed at each surface to prevent the oxidizing agent from diffusing into the porous core. In other embodiments, a thermoplastic material of the flame retardant thermoplastic fiber-reinforced porous core comprises a polyolefin. In some examples, the polyolefin comprises polypropylene. In certain embodiments, the antioxidant is a phenolic antioxidant. In other embodiments, reinforcing fibers of the thermoplastic fiber-reinforced porous core comprise glass fibers. In some examples, the flame retardant thermoplastic fiber-reinforced porous core comprises magnesium hydroxide, aluminum hydroxide or both and wherein the flame retardant thermoplastic fiber-reinforced porous core meets ASTM E84, Class A specification.

In another aspect, a method of altering the color of a flame retardant thermoplastic fiber-reinforced porous core comprises forming the flame retardant thermoplastic fiber-reinforced porous core by combining the reinforcing fibers, flame retardant and the thermoplastic material to form a web, and exposing the formed web to an environment comprising oxidizing agent to alter the color of an antioxidant in the flame retardant thermoplastic fiber-reinforced porous core layer from a first color to a second color.

In certain embodiments, the web is exposed to the environment comprising the oxidizing agent prior to compressing of the web. In some embodiments, the web is exposed to the environment comprising the oxidizing agent after compressing of the web. In certain examples, the web is exposed to the environment comprising greater than 2 ppm oxidizing agent prior to disposing a skin on the web. In other examples, the web is exposed to the environment comprising greater than 2 ppm oxidizing agent after disposing a porous skin on the web. In additional examples, a thermoplastic material of the flame retardant thermoplastic fiber-reinforced porous core comprises a polyolefin. In some embodiments, the polyolefin comprises polypropylene. In certain embodiments, the antioxidant is a phenolic antioxidant. In other embodiments, reinforcing fibers of the thermoplastic fiber-reinforced porous core comprise glass fibers. In some instances, the flame retardant comprises magnesium hydroxide, aluminum hydroxide or both and wherein the flame retardant thermoplastic fiber-reinforced porous core meets ASTM E84, Class A specification.

In an additional aspect, a thermoplastic composite article comprises a porous core comprising reinforcing fibers, a flame retardant material and a thermoplastic material, wherein the porous core comprises a web formed from the reinforcing fibers held in place by the thermoplastic material, and wherein the thermoplastic material is substantially free of an antioxidant that turns pink upon exposure to oxidizing agent.

In certain examples, the thermoplastic material consists essentially of a polyolefin, e.g., is polypropylene or polyethylene. In some examples, the thermoplastic material consists of a polyolefin, e.g., is polypropylene or polyethylene. In some embodiments, the flame retardant comprises magnesium hydroxide, aluminum hydroxide or both and wherein the porous core meets ASTM E84, Class A specification. In other embodiments, the reinforcing fibers comprise glass fibers and the polyolefin comprises polypropylene. In other embodiments, the composite further comprises a first skin disposed on a first surface of the porous core. In some embodiments, the porous core layer is free of any phenolic antioxidants. In other examples, the composite comprises a non-phenolic antioxidant in the porous core.

In another aspect, a thermoplastic composite article comprises a porous core comprising reinforcing fibers and a thermoplastic material, wherein the porous core further comprises a metal hydroxide flame retardant and an antioxidant, wherein the porous core comprises a web formed from the reinforcing fibers held in place by the thermoplastic material, and wherein the antioxidant in the porous core comprising the metal hydroxide flame retardant, when exposed to oxidizing agent, changes color from a first color to a second color and when the oxidizing agent is removed changes color from the second color to the first color.

In certain embodiments, the thermoplastic material comprises a polyolefin. In some examples, the reinforcing fibers comprise glass fibers. In other examples, the metal hydroxide flame retardant comprises magnesium hydroxide, aluminum hydroxide or both. In some instances, the antioxidant comprises a phenolic antioxidant, the thermoplastic material comprises polypropylene, the reinforcing fibers comprise glass fibers and the metal hydroxide flame retardant comprises magnesium hydroxide. In some examples, the phenolic antioxidant turns pink upon exposure to the oxidizing agent. In other examples, the antioxidant comprises a phenolic antioxidant, the thermoplastic material comprises polypropylene, the reinforcing fibers comprise glass fibers and the metal hydroxide flame retardant comprises aluminum hydroxide. In some examples, the phenolic antioxidant turns pink upon exposure to the oxidizing agent. In other examples, the article comprise a first skin disposed on a first surface of the porous core and optionally a second skin disposed on a second surface of the porous core. In some examples, the article comprises an additive that reacts with the antioxidant to prevent formation of the pink color.

In another aspect, a thermoplastic composite article comprises a porous core comprising reinforcing fibers, a flame retardant material and a thermoplastic material, wherein the porous core comprises a web formed from the reinforcing fibers held in place by the thermoplastic material, wherein the thermoplastic material is substantially free of an antioxidant that turns pink upon exposure to oxidizing agent, and wherein the porous core meets ASTM E84, Class A specification.

In another aspect, a thermoplastic composite article comprises a porous core comprising reinforcing fibers, a flame retardant material and a thermoplastic material, wherein the porous core comprises a web formed from the reinforcing fibers held in place by the thermoplastic material, wherein the thermoplastic material is substantially free of an antioxidant that turns pink upon exposure to oxidizing agent, and wherein the porous core comprises a sound absorption coefficient of at least 0.25 or at least 0.4 or at least 0.5 as tested by ASTM C423-17.

In another aspect, a thermoplastic composite article comprises a porous core comprising reinforcing fibers, a flame retardant material and a thermoplastic material, wherein the porous core comprises a web formed from the reinforcing fibers held in place by the thermoplastic material, wherein the thermoplastic material is substantially free of an antioxidant that turns pink upon exposure to oxidizing agent, wherein the porous core meets ASTM E84, Class A specification, and wherein the porous core comprises a sound absorption coefficient of at least 0.25 or at least 0.4 or at least 0.5 as tested by ASTM C423-17.

In an additional aspect, a thermoplastic composite article comprises a porous core comprising reinforcing fibers, a flame retardant material and a thermoplastic material, wherein the porous core comprises a web formed from the reinforcing fibers held in place by the thermoplastic material, wherein the thermoplastic material is substantially free of an antioxidant that turns pink upon exposure to oxidizing agent, wherein the porous core comprises a sound absorption coefficient of at least 0.25 or at least 0.4 or at least 0.5 as tested by ASTM C423-17, meets ASTM E84, Class A specification and provides a substantially constant discoloration value (Delta E) as tested for 72 hours using Test Method AATCC 23 dated 2015.

Additional aspects, embodiments, examples, configurations and features are described in more detail below.

BRIEF DESCRIPTION OF THE SEVERAL VIEWS OF THE DRAWINGS

Certain specific configurations of composite articles and methods are described with reference to the accompanying figures in which.

Figure 1:
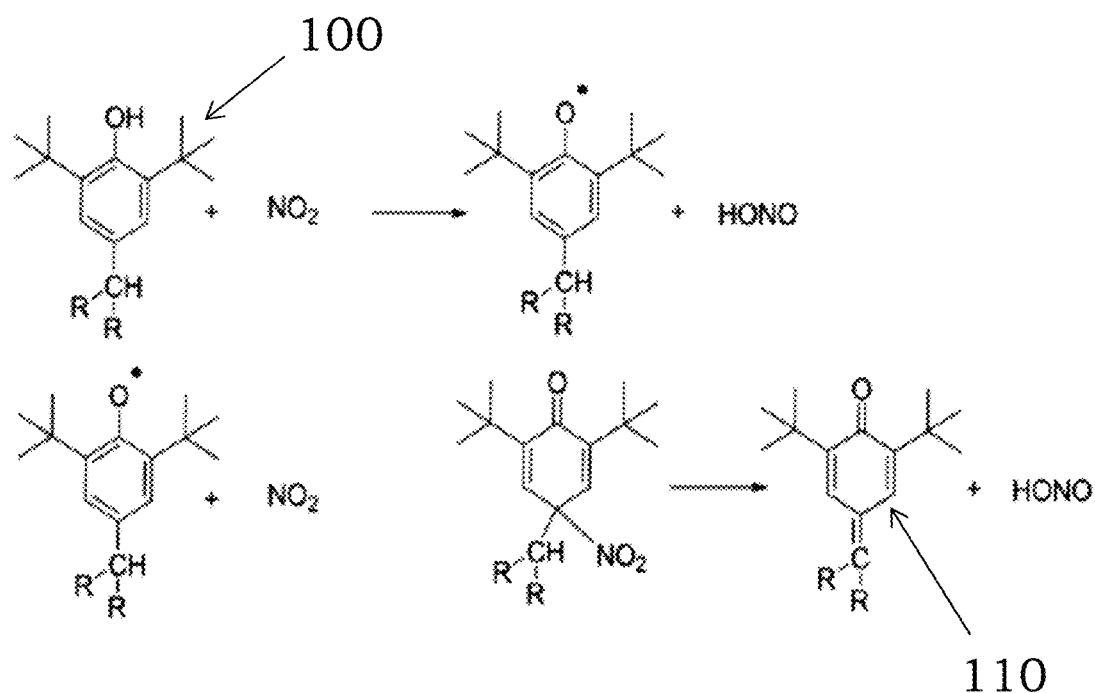
FIG. 1 shows a reaction where an oxidizing agent can react with a phenolic antioxidant, in accordance with some embodiments.

It will be recognized by the person having ordinary skill in the art, given the benefit of this disclosure, that the layers and other features shown in the figures are not necessarily drawn to scale. No particular thickness, dimensions or ordering is intended to be implied unless otherwise clear from the description of that particular figure or embodiment.

DETAILED DESCRIPTION

Examples of some configurations of composite articles are described that may be configured to resist discoloration (or promote formation of a certain color). While various layers are shown in the figures and are described below, the thickness, size and geometry of the different layers need not be the same and may be other thicknesses, size and geometries than those shown in the figures. Further, the exact arrangement or layering of the components can be altered or intermediate layers, e.g., adhesive layers, may be present between the illustrative layers shown in the figures.

In certain embodiments, the reinforcing materials, first thermoplastic material and compounded flame retardant materials of the articles described herein are generally present in a prepreg or core layer. A prepreg can be a non-fully formed core layer and may comprise materials that are processed to form a final core layer. For example, the prepreg may comprise thermoplastic materials in combination with reinforcing fibers and a compounded flame retardant material but may not be fully formed or may be present in a softened state by application of heat. The prepreg may be pressed, compressed or molded into a desired shape to provide a core layer. The other layers coupled to the prepreg layer may be added prior to fully forming the core or after fully forming the core. The other layers can be coupled to the prepreg or core layer using an adhesive or, in some instances, the prepreg or core layer may be directly coupled to other layers without the use of any adhesive material between the prepreg or core layer and the other layers.

In certain examples, the prepregs or core layers can be used in a lightweight reinforced thermoplastic (LWRT) article. LWRT's can provide certain desirable attributes including, but not limited to, a high stiffness-to-weight ratio, a low part weight, a simple and low-cost part forming process, a low coefficient of thermal expansion, recyclability, and others. LWRT articles have broad applications in the automotive industry, including different kinds of soft trims for both interior and exterior applications. Recreational vehicles, commercial truck trailers, and similar applications represent another category of the broad applications of LWRT articles. Ceiling tiles, office panels, cubicle panels and building and construction industries may also use the LWRT articles described herein.

Certain composite articles are described herein that include a first thermoplastic material, a compounded flame retardant and reinforcing materials. As discussed in more detail below, one or more additives that may be present in the compounded flame retardant, the thermoplastic material or the reinforcing materials may promote discoloration or some color change of the core layer. For example, a material may be present that can induce a color change, e.g., white to pink, white to yellow or white to another color, under certain conditions, e.g., in the presence of an oxidizing agent or oxidant the composite article may change color. By omitting the material which reacts with the oxidizing agent, the selected color of the composite article can be retained. Alternatively, the presence of the material in the composite article that can induce a color change can advantageously be utilized to promote a color change under certain environmental conditions. In addition, the composite article may be subjected to selected environmental conditions to avoid or promote discoloration as desired. In some instances, the antioxidant may be omitted from the compounded flame retardant material but may still be present in the core layer, e.g., the first thermoplastic material may comprise an antioxidant. For example, as discussed in more detail below, when certain flame retardants are present, the conditions may promote a color change in the compounded flame retardant material. In some instances, by using a compounded flame retardant material that is free of any phenolic antioxidants, an antioxidant can still be present in the final core layer without any color change resulting.

In certain embodiments, the compounded flame retardant material typically comprises a flame retardant material that has been compounded with another material, e.g., a second thermoplastic material. In existing compounded flame retardant materials, the overall composition of the compounded flame retardant material typically also comprises an antioxidant (AO) to prevent oxidation of the thermoplastic material during and/or after the compounding process. The AO can react with an oxidizing agent, e.g., ozone, oxygen, air, nitrogen oxides, etc., to provide a pink-colored compound or a yellow-colored compound, which can impart an overall non-desirable color to the core layer. One illustration of a reaction is shown in FIG. 1, where a phenolic AO reactant (labeled for reference as 100) is shown as reacting with $NO_x$ compounds (nitric oxide, nitrogen dioxide or other nitrogen oxides) to produce a pink or yellow product (labeled for reference as 110) depending on the particular phenolic AO which is present. The "R" groups shown in FIG. 1 are typically hydrocarbon groups including one up to about eight carbon atoms, though non-carbon groups such as nitrogen, oxygen and hydroxyl groups may also be present. This reaction is reversible and can depend, at least in part, on humidity, heat, ultraviolet light and other factors. In some examples, the produced phenolic methides, e.g., quinone methides, can be reversed by exposing them to sunlight/UV or altering the humidity conditions or both. For example, it can be possible to force the product 110 to revert back to the reactant 100 by subjecting the product 110 to suitable environmental conditions. In other instances, the presence of an alkaline flame retardant such as aluminum hydroxide (ATH) or magnesium hydroxide (MDH) or other metal hydroxides can promote formation of the phenolic methide products and enhance the pink or yellow coloring. The alkaline environment can disfavor reversion of the product 110 back to the reactant 100 by shifting the equilibrium to favor formation of the product 110.

In certain examples described herein, the exact material used as the compounded flame retardant material may vary depending on the desired overall properties of the prepreg or core and/or the methods used to produce the prepreg or core. The compounded flame retardant material typically comprises a flame retardant agent or material that has been compounded with another material such as a polymeric material. For example, the compounded flame retardant material may comprise a flame retardant agent that has been compounded with one or more thermoplastic or thermoset materials. In some instances, the thermoplastic or thermoset materials are free or substantially free of any anti-oxidants that may cause a color change of the core layer upon exposure to one or more of air, an oxidizing agent, high humidity, e.g., above 50% relative humidity, UV exposure or other environmental conditions. Where the prepreg or core comprises a thermoplastic material in combination with reinforcing fibers, one material present in the compounded flame retardant material may also be a thermoplastic material. The virgin thermoplastic material in the prepreg or core may be the same or may be different from the thermoplastic material present in the compounded flame retardant material. In some instances where a thermoplastic material is present in the compounded flame retardant material, the thermoplastic material of the compounded flame retardant material may comprise one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastic materials for use in the compounded flame retardant material include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly (1,4 phenylene) compounds commercially known as PARMAX®, high heat polycarbonate such as Bayer's APEC® PC, high temperature nylon, and silicones, as well as alloys and blends of these materials with each other or other polymeric materials. Compounded flame retardant materials comprising a thermoplastic material compounded with a flame retardant material are referred to in certain instances herein as compounded flame retardant thermoplastic materials.

In certain embodiments, the flame retardant agent used in the compounded flame retardant material may comprise many different materials including organic and inorganic flame retardant materials. In some instances, these flame retardant materials do not change color upon exposure to certain environmental conditions or materials, e.g., oxidizing agents. In certain configurations, the flame retardant agent of the compounded flame retardant material may comprise an inorganic material or inorganic salt. For example, restrictions on hazardous substances (RoHS) may make it desirable to select the flame retardant material as an inorganic salt that is substantially free (or free) of any halides. In some embodiments, the flame retardant material may comprise a group II metal or a group III metal in combination with one or more anions. For example, the flame retardant material of the compounded flame retardant material may comprise beryllium, calcium, magnesium or other Group II metal salts. In some embodiments, the Group II metal of the compounded flame retardant material may be present as a hydroxide material. For example, the flame retardant material may be present as beryllium hydroxide, calcium hydroxide, magnesium hydroxide or other group II metal hydroxides. In other instances, the flame retardant material of the compounded flame retardant material may comprise aluminum, gallium, indium or other Group III metal salts. In some embodiments, the Group III metal salt of the compounded flame retardant material may be present as a hydroxide material. For example, the flame retardant material may be present as aluminum hydroxide or gallium hydroxide or other group III metal hydroxides.

In other configurations, the inorganic material present as a flame retardant material may comprise one or more transition metal salts which can function as flame retardant materials. For example, transition metals which can form divalent cations in solution may be combined with one or more anions and used as flame retardant agents. In some instances, the transition metal salt may be present in non-halide form, e.g., may not be present as a fluoride, chloride, bromide or iodide salt, to avoid outgas sing of toxic gases should the prepreg or core undergo burning. In certain configurations, the transition metal salt may be present, for example, as a hydroxide.

In certain embodiments, the exact amount of the compounded flame retardant material used in the prepregs and cores may vary depending on which other materials are present, but the compounded flame retardant material typically is present at a weight percentage less than a major amount of the prepreg or core, e.g., the compounded flame retardant material is typically present at 50 weight percent or less based on the weight of the prepreg or core. In certain instances, the compounded flame retardant material is present above a minor amount to provide flame retardancy to the prepreg or core. For example, the compounded flame retardant material may be present at 30 weight percent or more, 35 weight percent or more, 40 weight percent or more or even 45 weight percent or more based on the weight of the prepreg or core. Illustrative compounded flame retardant materials are commercially available from many different suppliers. For example, the flame retardant material, e.g., group II metal hydroxide, can be mixed with another material, e.g., thermoplastic material, using an extrusion process. In some instances, the thermoplastic material is added to an extruder and melted. As noted herein, the melted thermoplastic material of the compounded flame retardant material can desirably be free of any phenolic antioxidants which can turn color upon exposure to an oxidizing agent. The melted polymer can be pushed or propelled into a barrel where the flame retardant material is then added. The resulting mixture is propelled forward, which acts to mix the flame retardant material into the melted thermoplastic material which is free of the phenolic AO's that can change color. The resulting mixture may then be cooled to form solid materials such as particles, fibers or pellets. In instances where no AO is present in the compounded flame retardant material, it may be desirable to store the compounded flame retardant material under inert conditions to avoid oxidation of the thermoplastic material, e.g., under vacuum or otherwise under conditions where the compounded flame retardant material is not exposed to air, UV or other external factors that can result in degradation of the polymeric component of compounded flame retardant material. In some examples, the compounded flame retardant material may comprise a Group II or Group III metal salt compounded with a polyolefin such as, for example, polyethylene, polypropylene or the like. For example, a group II metal hydroxide or a group III metal hydroxide can be compounded with polyethylene, polypropylene or co-polymers thereof, e.g., MDH or ATH can be compounded with polypropylene or polyethylene.

In certain embodiments, the particular ratio of the flame retardant material to thermoplastic material in the compounded flame retardant material can vary. For example, the flame retardant material:thermoplastic material ratio in the compounded flame retardant material may vary from 1:1, 2:1 3:1, 4:1, 5:1, 1:5, 1:4, 1:3 or 1:2. In instances where the compounded flame retardant material comprises an inorganic flame retardant salt in combination with a second thermoplastic material, the inorganic salt typically is present in the compounded flame retardant material in a higher amount. For example, the ratio of inorganic salt:thermoplastic material may be about 2:1, 3:1, 3:2, 5:2, 7:2, 4:3, 5:3, 7:3, 8:3, 5:4, 7:4, 9:4, 11:4, 6:5, 7:5, 8:5, 9:5, 11:5, 13:5 or other ratios. If desired, however, the second thermoplastic material could be present in an equal amount by weight in the compounded flame retardant material or may even be present in the compounded flame retardant material in an amount by weight that is higher than the flame retardant material.

Depending on the particular process used to produce the prepregs or core, the compounded flame retardant material can be ground, filtered, sized or otherwise processed prior to adding it to the other materials of the prepreg or core. In some instances where first thermoplastic particles are used in the prepreg or core, the average particle size of the compounded flame retardant material may be about the same as the average particle size of the first thermoplastic material. In other configurations, the average particle size of the compounded flame retardant material may be smaller or larger than the average particle size of the first thermoplastic material used in the prepreg or core.

In certain embodiments, the first thermoplastic material of the core layer may be used in the prepreg or core in a fiber form, particle form, resin form or other suitable forms. In some examples, the first thermoplastic material may comprise a polyolefin or other thermoplastic materials. For example, the first thermoplastic material may comprise one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. In certain configurations, the thermoplastic material of the core layer, e.g., the first thermoplastic material, may optionally comprise an antioxidant if desired. By separating the antioxidant from any basic flame retardant materials present in the compounded flame retardant material, discoloration can be reduced or avoided in the finally formed core layer. In other instances, the first thermoplastic material may also be free or substantially free of antioxidant materials that change color upon exposure to an oxidizing agent. Illustrative thermoplastic materials in various forms are described herein and are also described, for example in U.S. Publication Nos. 20130244528 and US20120065283. The exact amount of thermoplastic material present in the prepreg or core can vary and illustrative amounts range from about 10% by weight to about 90% by weight, e.g., about 20% by weight to about 80% by weight or about 30% by weight to about 70% by weight or about 40% by weight to about 60% by weight.

In certain embodiments, the reinforcing materials present in the prepreg or core layer can be present in fiber, particle, whisker or other forms. For example, reinforcing fibers may be present along with the thermoplastic materials and flame retardant to form a web of the reinforcing fibers which can be held in place by the thermoplastic materials. In some examples, reinforcing fibers may comprise glass fibers, carbon fibers, graphite fibers, synthetic organic fibers, particularly high modulus organic fibers such as, for example, para- and meta-aramid fibers, nylon fibers, polyester fibers, or any of the high melt flow index resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina, silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the compounded flame retardant material or both. Alternatively, the flame retardant material can be reacted with the thermoplastic material of the prepreg or core to provide a derivatized thermoplastic material that is then mixed with the fibers. The reinforcing material content in the prepreg or core may be from about 10% by weight to about 90% by weight, e.g., about 20% to about 80% by weight of the prepreg or core, more particularly from about 30% to about 70%, by weight of the prepreg or core or about 40% by weight about 60% by weight of the prepreg or core. Typically, where reinforcing fibers are used the fiber content of a composite article comprising the prepreg or core varies between about 20% to about 90% by weight, more particularly about 30% by weight to about 80% by weight, e.g., about 40% to about 70% by weight of the composite. The particular size and/or orientation of the fibers used may depend, at least in part, on the polymer material used and/or the desired properties of the resulting prepreg or core. Suitable additional types of fibers, fiber sizes and amounts will be readily selected by the person of ordinary skill in the art, given the benefit of this disclosure. In one non-limiting illustration, fibers dispersed within a thermoplastic material to provide a prepreg or core generally have a diameter of greater than about 5 microns, more particularly from about 5 microns to about 22 microns, and a length of from about 5 mm to about 200 mm, more particularly, the fiber diameter may be from about microns to about 22 microns and the fiber length may be from about 5 mm to about 75 mm. In some configurations, the flame retardant material used in the compounded flame retardant material may also be present in fiber form. For example, the prepreg, core or composite may comprise a thermoplastic material, reinforcing fibers and fibers comprising a compounded flame retardant material. The compounded flame retardant material fibers may comprise any one or more of the flame retardant materials described herein, e.g., polypropylene fibers compounded with a metal hydroxide material which is then extruded and cut into fibers using a suitable die and/or other devices.

In some configurations, the prepreg or core may be a substantially halogen free or halogen free prepreg or core to meet the restrictions on hazardous substances requirements for certain applications. In other instances, the prepreg or core may comprise a halogenated flame retardant agent (which can be present in the flame retardant material or may be added in addition to the flame retardant material) such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the prepregs and cores may comprise one or more halogens to impart some flame retardancy without the addition of another flame retardant agent. For example, the thermoplastic material of the compounded flame retardant material may be halogenated in addition to being compounded with a flame retardant material, or the virgin thermoplastic material may be halogenated. Where halogenated flame retardants are present, the flame retardant is desirably present in a flame retardant amount, which can vary depending on the other components which are present. For example, the halogenated flame retardant where present in addition to the compounded flame retardant material may be present in about 0.1 weight percent to about 15 weight percent (based on the weight of the prepreg or core), more particularly about 1 weight percent to about 13 weight percent, e.g., about 5 weight percent to about 13 weight percent. If desired, two different halogenated flame retardants may be added to the prepregs or core. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the prepregs may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the prepreg or core), more particularly about 1 weight percent to about 13 weight percent, e.g., about 5 weight percent to about 13 weight percent based on the weight of the prepreg or core. If desired, two different substantially halogen free flame retardants may be added to the prepregs or cores. In certain instances, the prepregs or cores described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants (exclusive of any compounded flame retardant material) present may be about 0.1 weight percent to about 20 weight percent (based on the weight of the prepreg or core), more particularly about 1 weight percent to about 15 weight percent, e.g., about 2 weight percent to about 14 weight percent based on the weight of the prepreg or core. The flame retardant agents used in the prepregs or cores described herein can be added to the mixture comprising the thermoplastic material and fibers (prior to disposal of the mixture on a wire screen or other processing component) or can be added after the prepreg or core is formed.

In certain embodiments, the prepregs or cores described herein generally comprise a substantial amount of open cell structure such that void space is present in the prepreg. For example, the prepreg or core may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the prepreg or core comprises a porosity or void content of greater than 0%, e.g., is not fully consolidated, up to about 95%. Unless otherwise stated, the reference to the prepreg or core comprising a certain void content or porosity is based on the total volume of the prepreg or core and not necessarily the total volume of the prepreg or core plus any other materials or layers coupled to the prepreg or core.

Figure 2A:
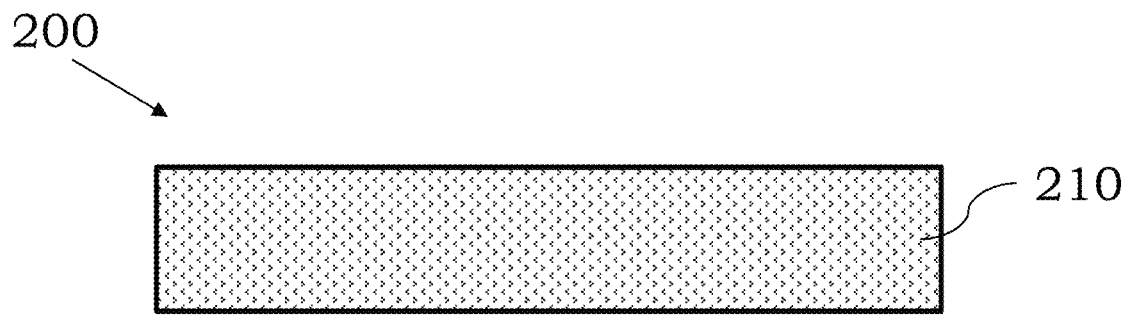
FIG. 2A is an illustration of a composite article comprising a core layer, in accordance with certain examples.

Referring now to FIG. 2A, a composite article 200 is shown that comprises a core layer 210. The core layer 210 comprises a first thermoplastic material, reinforcing materials, and a compounded flame retardant material which typically includes a flame retardant material that has been compounded with a second thermoplastic material. The materials together form a web of open cell structures such that the core layer 210 is highly porous. This high porosity decreases the overall weight of the core layer 210 but permits oxidizing agents to permeate into the core and potentially allow discoloration of the core layer 210. In some configurations, by configuring the core layer 210 without any antioxidant present in the compounded flame retardant material, discoloration or color changes can be avoided. In other instances, the entire core layer 210 can be free or substantially free of any antioxidants. While not required the flame retardant material present in the compounded flame retardant material can be dispersed throughout the prepreg or core 210. For example, the core 210 comprises flame retardant material dispersed generally throughout the prepreg or core 210. In some instances, the flame retardant material dispersion can be substantially homogeneous or substantially uniform from a first surface to a second surface of the prepreg or core 210. As described in more detail herein, to achieve such substantially homogeneous or substantially uniform distribution of flame retardant material in the prepreg or core 210, the components of the core can be mixed together to form a dispersion prior to forming the prepreg or core. Mixing can be performed until the dispersion comprises a substantially homogeneous or substantially uniform mixture of the flame retardant material(s), the thermoplastic material and the fibers in the dispersion. The prepreg or core may then be formed as described herein, e.g., by disposing the dispersion on a wire screen using a suitable laying process followed by compressing and/or curing of the thermoplastic material of the prepreg to provide the core. In other configurations, it may be desirable to provide a gradient distribution of flame retardant material(s) from one surface of the prepreg or core to the other surface of the prepreg or core. In some configurations, a substantially uniform distribution of flame retardant material is present in a prepreg or core and then additional flame retardant material is added to one side of the prepreg or core to provide a gradient distribution. Such additional flame retardant material can be added directly to the prepreg or core, e.g., by spraying or coating or by using a solution comprising the flame retardant material, or can be added by coupling a skin, additional prepreg or core or other component comprising flame retardant material to the prepreg or core. For example, a first prepreg or core and a second prepreg or core disposed on the first prepreg or core to provide a composite article. Each of the prepregs or cores may comprise a substantially uniform distribution of flame retardant material, but the amount and/or type of flame retardant material in the two prepregs or cores can be different, e.g., the loading rates can be different or the flame retardant materials themselves may be different. If desired, however, only one of the prepregs or cores may comprise flame retardant material and the other prepreg or core may not comprise materials other than the thermoplastic material and reinforcing fibers. The thermoplastic materials of the prepregs or cores can be melted to provide a single combined prepreg or core including materials from the two prepregs or cores. The result of melting of the prepregs or cores is a composite core with a gradient distribution of flame retardant material. In other configurations, a distribution of flame retardant material in a prepreg or core can be provided by coupling a skin or other material comprising flame retardant material to the prepreg or core. In other instances, the skin can be melted into the prepreg or core to couple the skin and the prepreg or core to leave a coupled skin/core composite material without any substantial interface. If desired and as described in more detail below, an additional skin, which may or may not comprise flame retardant material can also be coupled to the prepreg or core on an opposite side from the first skin.

In other instances, the core layer 210 may comprise an antioxidant but the antioxidant is not present in the compounded flame retardant material. For example, the first thermoplastic material of the core layer 210 may comprise an antioxidant or the reinforcing materials of the core layer 210 may comprise an antioxidant, but the compounded flame retardant material may be free or substantially free of any antioxidant to avoid or reduce the likelihood of a color change. Alternatively, a separate antioxidant can be added to the core layer during or after formation if desired.

Figure 2B:
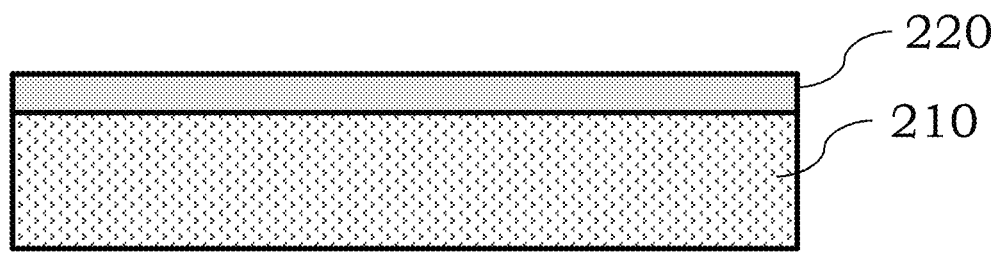
FIG. 2B is an illustration of a composite article comprising a core layer and a skin, in accordance with certain examples.
Figure 2C:
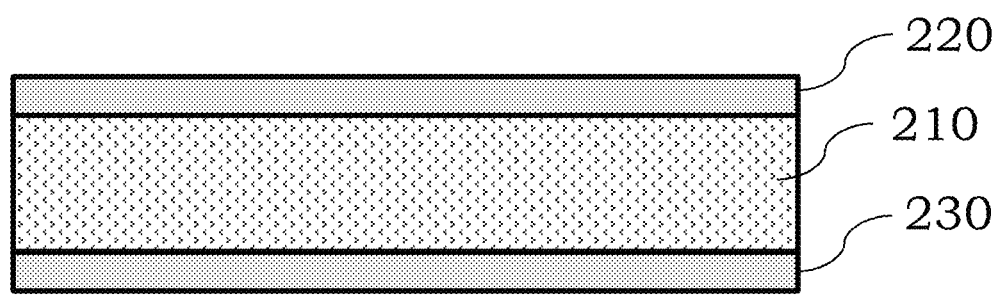
FIG. 2C is an illustration of a composite article comprising a core layer and a skin on each surface of the core layer, in accordance with certain examples.

In other embodiments, the composite article may also comprise one or more skins disposed on a surface of a prepreg or core layer. For example and referring to FIGS. 2B and 2C, a first skin 220 is shown disposed on a first surface of the core 210 (see FIG. 2B) and an optional second skin 230 may be disposed on a second surface of the core 210 (see FIG. 2C). The skins 220, 230 can be the same or can be different. For example, the skins 220, 230 can independently comprise an open cell structure or a closed cell structure. In certain configurations, each of the skins 220, 230 may independently comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating disposed on the prepreg or core 210. In other instances, each of the skins 220, 230 may independently comprise a limiting oxygen index greater than about 22, as measured per ISO 4589 dated 1996. Where a thermoplastic film is present as (or as part of) one or both of the skins 220, 230, the thermoplastic film may comprise at least one of poly(ether imide), poly(ether ketone), poly(etherether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) one or both of the skins 220, 230, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) one or both of the skins 220, 230, the coating may comprise at least one of unsaturated polyurethanes, vinyl esters, phenolics and epoxies. Where an inorganic coating is present as (or as part of) one or both of the skins 220, 230, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) one or both of the skins 220, 230, the non-woven fabric may comprise a thermoplastic material, a thermal setting binder, inorganic fibers, metal fibers, metallized inorganic fibers and metallized synthetic fibers. If desired, one or both of the skins 220, 230 may comprise an expandable graphite material and/or a compounded flame retardant material.

Figure 2D:
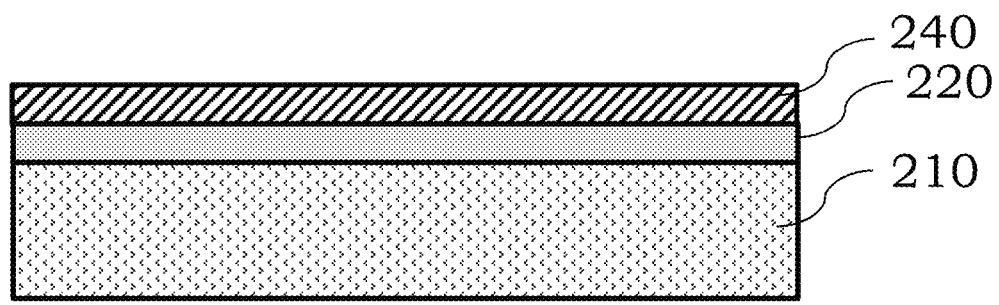
FIG. 2D is an illustration of a composite article comprising a core layer, a skin and a decorative layer on the skin, in accordance with certain examples.
Figure 2E:
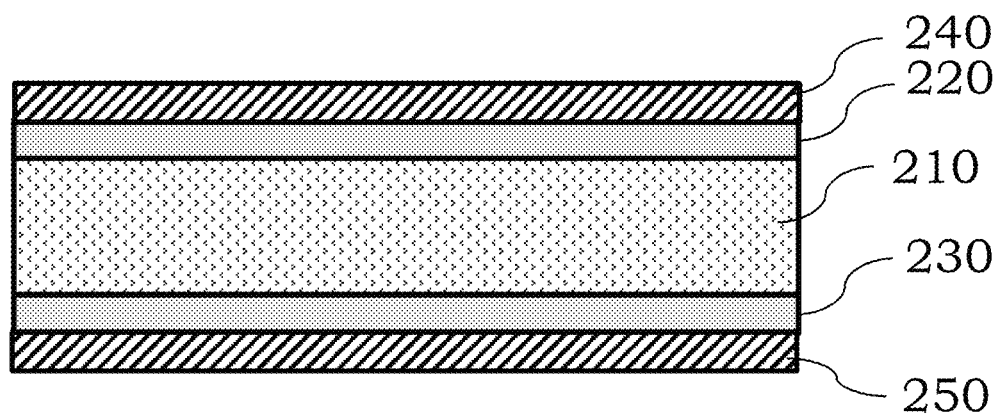
FIG. 2E is an illustration of a composite article comprising a core layer, a skin on each surface of the core layer and decorative layers on each of the skins, in accordance with certain examples.

In certain configurations, the composite article may also comprise one or more decorative layers disposed on one of the skins. FIG. 2D shows a first decorative layer 240 disposed on the skin 220, and FIG. 2E shows a second decorative layer 250 disposed on the skin 250. While not shown a decorative layer could be disposed directly on the core 210 opposite a surface where the skin 220 is disposed in FIG. 2A. The decorative layers 240, 250 can independently be a thermoplastic film of polyvinyl chloride, polyolefins, thermoplastic polyesters, thermoplastic elastomers, or the like. The decorative layers 240, 250 can independently be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layers 240, 250 can independently be produced using spunbond, thermal bonded, spun lace, melt-blown, wet-laid, and/or dry-laid processes. In some configurations, the decorative layers 240, 250 can independently comprise an open cell structure or a closed cell structure. The decorative layers 240, 250 can be the same or different as desired.

Figure 3:
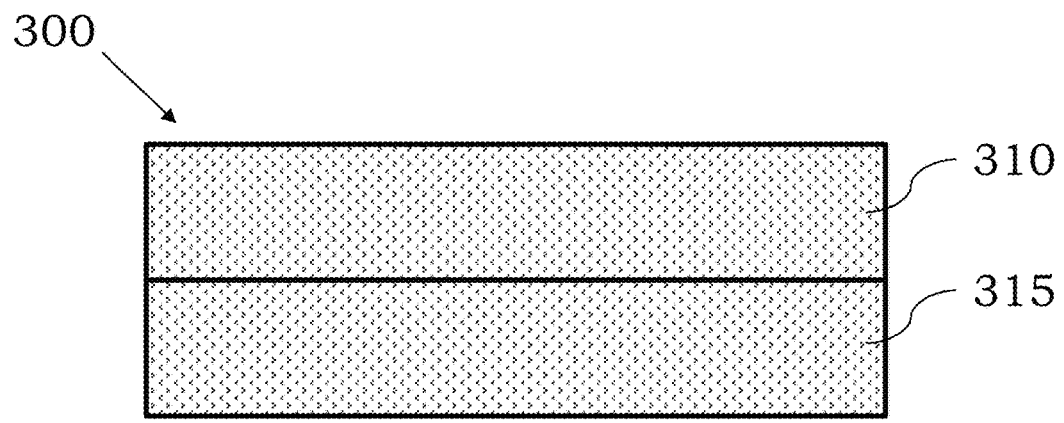
FIG. 3 is an illustration of two core layers coupled to each other, in accordance with some embodiments.

In some embodiments, two or more prepreg or core layers can be coupled to each other as shown in FIG. 3. The composite article 300 comprises a first prepreg or core layer 310 coupled to a second prepreg or core layer 320. The layers 310, 320 can be the same or can be different. In some examples, the layer 310 may comprise a compounded flame retardant material that is substantially free of antioxidants, and the layer 315 may comprise a compounded flame retardant material where an antioxidant is present. By placing the layer 310 without antioxidants on an outer surface, discoloration of the outer layer 310 can be avoided. Even if the inner layer 315 becomes discolored, its positioning under the layer 310 may generally not result in an overall alteration of the color of the article 300. While not shown, the composite article can include any of the skins and/or decorative layer configurations shown in FIGS. 2B-2E if desired.

In certain embodiments, the LWRT articles described herein can provide a desired level of flame retardancy and acoustic absorption or noise reduction. For example, certain articles described herein can meet either the FMVSS 302 test or the SAE J369 test standard. These tests are generally equivalent and are used to determine burning rate measurements. In brief, the tests use a horizontal flame chamber, a fume hood, a tote large enough to handle specimens of about 12 inches in length, a water source, a timer, a lighter and a ruler. The specimen size is about 4 inches by about 12 inches with 5 or more specimens typically being tested. The adhesive side of the specimen is typically subjected to the flame. For FMVSS 302 tests, the fume hood is typically opened enough to provide an air flow of about 150 cubic feet per minute. For the SAE J369 test, the fume hood, for example, may be opened to provide the same air flow or may be opened all the way. Unless otherwise noted herein, the FMVSS 302 test can be interchanged with the SAE J369 test. The results of these tests can be classified in several ways including DNI, SE/0, SE/NBR, SE/B, B, and RB. DNI refers to the material not supporting combustion during or following a 15 second ignition period and/or the material not transmitting a flame front across either surface to a selected distance. SE/0 refers to the material igniting on the surface, but the flame extinguishes itself before it moves a selected distance. SE/NBR refers to the material stopping burning before it has burned for 60 seconds from the start of timing and not burning more than about 50 mm from the point where timing was started. SE/B refers to the leading flame front progressing a selected distance but extinguishing itself before reaching a second distance. B refers to the material burning the entire distance. RB refers to the materials that burn so rapidly it is not possible to time the burning rate. One or more of burn distance, burn time, burn rate, and whether the material is self-extinguishing may also be measured. Specimens may be considered to "meet" or "pass" the FMVSS 302 or SAE J369 tests if the flame travels less than about 102 mm per minute. Specimens may fail the tests if they burn faster than 102 mm per minute.

In some configurations described herein, the presence of compounded flame retardant material in a thermoplastic prepreg or a thermoplastic core permits the prepreg or core to provide flame retardancy to at least some degree. For example, the prepreg or core (and composite articles including the prepreg or core layer) may meet the Class A standard of ASTM E84 test dated 2009 and entitled "Standard Test Method for Surface Burning Characteristics of Building Materials"). The particular flame retardant material selected for use in the core layer may provide an article that meets the ASTM E84 class A or class B requirements in an as-produced article, e.g., without any molding, or in a molded article if desired. Class A articles differ from class B articles in that class A articles have a flame spread index (FSI) of about 0-25 whereas class B articles have a flame spread index of about 26-75. In some instances, enough of the compounded flame retardant material is present in the final prepreg or core so the prepreg or core meets the class A standard under the ASTM E84 test dated 2009.

In certain examples, the LWRT articles described herein may also provide acoustic absorption or noise reduction in addition to being flame retardant. Various different acoustic measurement tests can be performed to assess noise reduction including ASTM C423-17 entitled "Standard Test Method for Sound Absorption and Sound Absorption Coefficients by the Reverberation Room Method." For example, sound absorption average (SAA) values can be measure based on the absorption at sets of frequencies. Similar to SAA, NRC (noise reduction coefficient) is also based on a set of frequencies. The sound absorption average (SAA) is defined as a single number rating, the average, rounded to the nearest 0.01, of the sound absorption coefficient of a material for the twelve one-third octave bands from 200 through 2500 Hz, inclusive. The noise reduction coefficient (NRC) is defined from previous versions of this same test method as the average of the coefficients at 250, 500, 1000, and 2000 Hz, expressed to the nearest integral multiple of 0.05. In NRC/SAA tests, the specimen mounting method is also specified and is described in the ASTM E795-16 Type E 400 mounting method. In some instances, the composite articles described herein can be flame retardant, e.g., meet E84, Class A specifications, and comprise a sound absorption coefficient of at least 0.25 or at least 0.4 or at least 0.5 as tested by ASTM C423-17.

In certain configurations of the articles described herein where an antioxidant is not present in a compounded flame retardant material, the articles may provide both flame retardancy and noise reduction. It will be recognized by the person of ordinary skill in the art, given the benefit of this disclosure, that the exact level of flame retardancy and noise reduction can depend on the materials used in the composite articles and their placement and orientation relative to incoming sound waves and/or potential heat or flame sources.

While various prepreg, cores and composite articles are described that include a compounded flame retardant that is free or substantially free of antioxidants that change color upon exposure to an oxidizing agent, antioxidants that do not change color upon exposure to oxidizing agents may be used. For example, tocopherols, phosphites, phosphates or phosphorated materials, Cyanox® 1790 or other Cyanox® materials, or other compounds that can prevent oxidation of the thermoplastic materials present in the compounded flame retardant material could be used instead of phenolic antioxidant materials. In some embodiments, the non-phenolic antioxidants do not result in an overall color change to the composite article even where oxidizing agents are present in the surrounding environment.

In other instances, the prepreg or core may comprise one or more acid scavengers. Illustrative acid scavengers include, but are not limited to, metal stearates and metal oxides, e.g., calcium stearate, zinc stearate, zinc oxide, calcium lactate or dihydrotalcite. These or other suitable acid scavengers can be used to deter discoloration of the prepregs and cores described herein. Alternatively, when discoloration is desired, the prepregs or core can be free of any acid scavengers, e.g., free or substantially free of a metal stearate or a metal oxide such as, for example, calcium stearate, zinc stearate, zinc oxide, or calcium lactate.

In some instances, a phenolic antioxidant may be present and used to manipulate the color of the composite article. For example, a thermoplastic composite article may comprise a porous core comprising reinforcing fibers and a thermoplastic material, wherein the porous core further comprises a metal hydroxide flame retardant and an antioxidant, wherein the porous core comprises a web formed from the reinforcing fibers held in place by the thermoplastic material, and wherein the antioxidant in the porous core comprising the metal hydroxide flame retardant, when exposed to oxidizing agent, changes color from a first color to a second color and when the oxidizing agent is removed changes color from the second color to the first color. Since the reaction where the phenolic antioxidant changes color can be reversed, the color can be favored or deterred depending on the particular environmental conditions present.

In some embodiments, the prepregs and cores may include additional materials or additives to impart desired physical or chemical properties. It is a substantial attribute of using the flame retardant materials described herein that a non-colored or colored article can be produced depending on the overall composition and environmental conditions. Where a non-colored article is produced, the article may then be colored or dyed to provide a desired color, texture, pattern, etc. For example, one or more dyes, texturizing agents, colorants, viscosity modifiers, smoke suppressants, synergistic materials, lofting agents, particles, powders, biocidal agents, foams or other materials can be mixed with or added to the prepregs or the cores to impart a desired color, texture or properties. In some instances, the prepregs or cores may comprise one or more smoke suppressant compositions in the amount of about 0.2 weight percent to about 10 weight percent. Illustrative smoke suppressant compositions include, but are not limited to, stannates, zinc borates, zinc molybdate, magnesium silicates, calcium zinc molybdate, calcium silicates, calcium hydroxides, and mixtures thereof. If desired, a synergist material can be present to enhance the physical properties of the prepregs or cores. For example, a synergist that enhances flame retardancy may be present.

In other instances, the prepregs or cores described herein may comprise a thermosetting material in a desired amount, e.g., in a minor amount less than about 50 weight percent based on the total weight of the prepreg or core, to impart desired properties to the core. The thermosetting material may be mixed with the thermoplastic material or may be added as a coating on one or more surfaces of the prepregs or cores.

In certain embodiments, the prepregs or cores described herein can be configured as (or used in) a glass mat thermoplastic composite (GMT) or a light weight reinforced thermoplastic (LWRT). One such LWRT is prepared by HANWHA AZDEL, Inc. and sold under the trademark SUPERLITE® material. SUPERLITE® mat loaded with flame retardant material can provide desirable attributed including, for example, flame retardancy and enhanced processing capabilities. The areal density of such a GMT or LWRT can range from about 300 grams per square meter (gsm) of the GMT or LWRT to about 4000 gsm, although the areal density may be less than 300 gsm or greater than 4000 gsm depending on the specific application needs. In some embodiments, the upper density can be less than about 4000 gsm. In certain instances, the GMT or the LWRT may comprise flame retardant material, e.g., EG materials in combination with a Group II or Group III metal hydroxide, compounded flame retardant materials, etc., disposed or present in void space of the porous GMT or the LWRT and/or on the fibers of the GMT or LWRT. Where a GMT or LWRT prepreg or core is used in combination with flame retardant material, the basis weight of the GMT or LWRT can be reduced to less than 800 gsm, 600 gsm or 400 gsm, for example, while still providing suitable flame retardant properties. In some examples, the overall thickness of the GMT or LWRT may be about 35 mm or less post lofting, 20 mm or less post lofting, greater than 3 mm pre-lofted or greater than 6 mm pre-lofted. In some instances, the pre-lofted thickness may be between about 3 mm and about 7 mm, and the post-lofted thickness may be between about 10 mm and about 25 mm.

In producing the prepregs and cores described herein, it may be desirable to use a wet-laid process. For example, a liquid or fluid medium comprising dispersed material, e.g., thermoplastic material, fibers and compounded flame retardant material, etc., optionally with any one or more additives described herein (e.g., other flame retardant agents), may be stirred or agitated in the presence of a gas, e.g., air or other gas. The dispersion may then be laid onto a support, e.g., a wire screen or other support material, to provide a substantially uniform distribution of the flame retardant material(s) in the laid down material. To increase flame retardant material dispersion and/or uniformity, the stirred dispersion may comprise one or more active agents, e.g., anionic, cationic, or non-ionic such as, for example, those sold under the name ACE liquid by Industrial Soaps Ltd., that sold as TEXOFOR® FN 15 material, by Glover Chemicals Ltd., and those sold as AMINE Fb 19 material by Float-Ore Ltd. These agents can assist in dispersal of air in the liquid dispersion. The components can be added to a mixing tank, flotation cell or other suitable devices in the presence of air to provide the dispersion. While an aqueous dispersion is desirably used, one or more non-aqueous fluids may also be present to assist in dispersion, alter the viscosity of the fluid or otherwise impart a desired physical or chemical property to the dispersion or the prepreg, core or article.

In certain instances, after the dispersion has been mixed for a sufficient period, the fluid with the suspended materials can be disposed onto a screen, moving wire or other suitable support structure to provide a web of laid down material. Suction or reduced pressure may be provided to the web to remove any liquid from laid down material to leave behind the thermoplastic material, the flame retardant material(s) and any other materials that are present, e.g., fibers, additives, etc. The resulting web can be dried and optionally consolidated or pressed to a desired thickness prior to fully forming it to provide a desired prepreg or core. While wet laid processes may be used, depending on the nature of the thermoplastic material, the flame retardant material and other materials present, it may be desirable to instead use an air laid process, a dry blend process, a carding and needle process, or other known process that are employed for making non-woven products. In some instances, additional flame retardant materials can be sprayed onto the surface of the prepreg or core after the prepreg or core has hardened to some degree by passing the board underneath a plurality of coating jets that are configured to spray the flame retardant materials at about a ninety degree angle to the prepreg or core surface. In addition, one or more skins may be added to the core to provide an article 1180.

In some configurations, the prepregs and cores described herein can be produced by combining a thermoplastic material, fibers, compounded flame retardant material(s), etc., in the presence of a surfactant in an aqueous solution or foam. The combined components can be mixed or agitated for a sufficient time to disperse the various materials and provide a substantially homogeneous aqueous mixture of the materials. The dispersed mixture is then laid down on any suitable support structure, for example, a wire mesh or other mesh or support having a desired porosity. Water can then be evacuated through the wire mesh forming a web. The web is dried and heated above the softening temperature of the thermoplastic powder. The web is then cooled and pressed to a predetermined thickness to produce a composite sheet having a void content of between about 1 percent to about 95 percent. In an alternate embodiment, the aqueous foam also includes a binder material.

In other processes producing the articles, the compounded flame retardant material can also be coated or sprayed onto the prepreg subsequent to forming of the web. Where a compounded flame retardant material comprising a flame retardant material compounded with a thermoplastic material is used, spraying or coating of the compounded flame retardant material onto the heat prepreg can result in melting of the thermoplastic material of the compounded flame retardant material and loading of the prepreg with the flame retardant material.

In certain examples, a prepreg or core in the form of a porous GMT can be produced. In certain instances, the GMT can be generally prepared using chopped glass fibers, a thermoplastic material, compounded flame retardant material and an optional thermoplastic polymer film or films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend are can be used as the thermoplastic material. To produce the glass mat, a thermoplastic material, reinforcing materials, flame retardant material(s) and/or other additives can be added or metered into a dispersing foam contained in an open top mixing tank fitted with an impeller. Without wishing to be bound by any particular theory, the presence of trapped pockets of air of the foam can assist in dispersing the glass fibers, the thermoplastic material and the flame retardant materials. In some examples, the dispersed mixture of glass and resin can be pumped to a head-box located above a wire section of a paper machine via a distribution manifold. The foam, not the glass fiber, flame retardant material or thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. When the hot web exits the dryer, a surface layer such as, for example, a film may be laminated onto the web by passing the web of glass fiber, flame retardant material, thermoplastic material and film through the nip of a set of heated rollers. If desired, additional layers such as, for example, a non-woven and/or woven fabric layer may also be attached along with the film to one side or to both sides of the web to facilitate ease of handling the glass fiber-reinforced mat. The composite can then be passed through tension rolls and continuously cut (guillotined) into the desired size for later forming into an end product article. Further information concerning the preparation of such GMT composites, including suitable materials and processing conditions used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

In certain embodiments, a method of preventing color change of a flame retardant thermoplastic fiber-reinforced porous core upon exposure to an environment comprising an oxidizing agent comprises producing the flame retardant thermoplastic fiber-reinforced porous core by combining reinforcing fibers, a first thermoplastic material, and a compounded material comprising a flame retardant compounded with a second thermoplastic material. The flame retardant thermoplastic fiber-reinforced porous core comprises a web formed from the reinforcing fibers held in place by the first thermoplastic material and the second thermoplastic material. The compounded material can be substantially free of an antioxidant that switches from a first color to a second color upon exposure to the environment comprising the oxidizing agent. In some examples, the compounded material is substantially free of phenolic antioxidants. In other examples, the second thermoplastic material consists essentially of a polyolefin, e.g., polypropylene or polyethylene. In other instances, the second thermoplastic material consists of a polyolefin. In additional examples, the compounded material consists of a flame retardant material compounded with a polyolefin. In some examples, the flame retardant thermoplastic fiber-reinforced porous core layer can be stored in the environment comprising the oxidizing agent for at least 24 hours without switching from the first color to the second color.

In some examples, the first thermoplastic material comprises a polyolefin. In other examples, the reinforcing fibers comprise glass fibers and the polyolefin of the first thermoplastic material comprises polypropylene. In some examples, the flame retardant comprises magnesium hydroxide, aluminum hydroxide or both, wherein the second thermoplastic material comprises a polyolefin and wherein the flame retardant thermoplastic fiber-reinforced porous core meets ASTM E84, Class A specification.

In other instances, a method of reducing color change of a flame retardant thermoplastic fiber-reinforced porous core comprises producing the flame retardant thermoplastic fiber-reinforced porous core by combining reinforcing fibers, a first thermoplastic material and a compounded material comprising a flame retardant compounded with a second thermoplastic material, wherein the flame retardant thermoplastic fiber-reinforced porous core comprises a web formed from the reinforcing fibers held in place by the first thermoplastic material and the second thermoplastic material. The compounded material comprises an antioxidant that turns from a first color to a second color upon exposure to an environment comprising oxidizing agent present at a first concentration. The antioxidant turns from the second color back to the first color upon exposure to an environment comprising oxidizing agent present at a second concentration lower than the first concentration. The method can include storing the flame retardant thermoplastic fiber-reinforced porous core in the environment comprising oxidizing agent present at or below the second concentration to maintain the flame retardant thermoplastic fiber-reinforced porous core at the first color. In some examples, the antioxidant comprises a phenolic antioxidant. In other instances, the first thermoplastic material consists essentially of a polyolefin. In some embodiments, the polyolefin is polypropylene or polyethylene. In other embodiments, the first thermoplastic material consists of a polyolefin, e.g., is polypropylene or polyethylene. In additional examples, the compounded material consists of a flame retardant material compounded with a polyolefin.

In certain examples, the method comprises storing the flame retardant thermoplastic fiber-reinforced porous core layer in the environment comprising the oxidizing agent present at the first concentration for at least 24 hours to turn the antioxidant in the flame retardant thermoplastic fiber-reinforced porous core from the first color to the second color. In some instances, the method comprises removing the flame retardant thermoplastic fiber-reinforced porous core layer from the environment comprising the oxidizing agent present at the first concentration and storing the flame retardant thermoplastic fiber-reinforced porous core layer in the environment comprising the oxidizing agent at or below the second concentration to turn the antioxidant in the flame retardant thermoplastic fiber-reinforced porous core from the second color to the first color.

In some examples, the first thermoplastic material comprises polypropylene and the reinforcing fibers comprise glass fibers. In other examples, the flame retardant comprises magnesium hydroxide, aluminum hydroxide or both, wherein the second thermoplastic material comprises a polyolefin and wherein the flame retardant thermoplastic fiber-reinforced porous core meets ASTM E84, Class A specification.

In other instances, a method of preventing a color change of a flame retardant thermoplastic fiber-reinforced porous core comprising a compounded material comprising an antioxidant comprises shielding the flame retardant thermoplastic fiber-reinforced porous core from exposure to an oxidizing agent in an environment surrounding the flame retardant thermoplastic fiber-reinforced porous core to prevent the antioxidant from changing from a first color to a second color upon exposure to the environment comprising the oxidizing agent.

In some embodiments, the shielding method comprises wrapping the flame retardant thermoplastic fiber-reinforced porous core with a material to prevent the oxidizing agent from reacting with the antioxidant in the flame retardant thermoplastic fiber-reinforced porous core. In other embodiments, the shielding method comprises packaging the flame retardant thermoplastic fiber-reinforced porous core in a substantially air tight container to prevent the oxidizing agent from reacting with the antioxidant in the flame retardant thermoplastic fiber-reinforced porous core.

Figure 4:
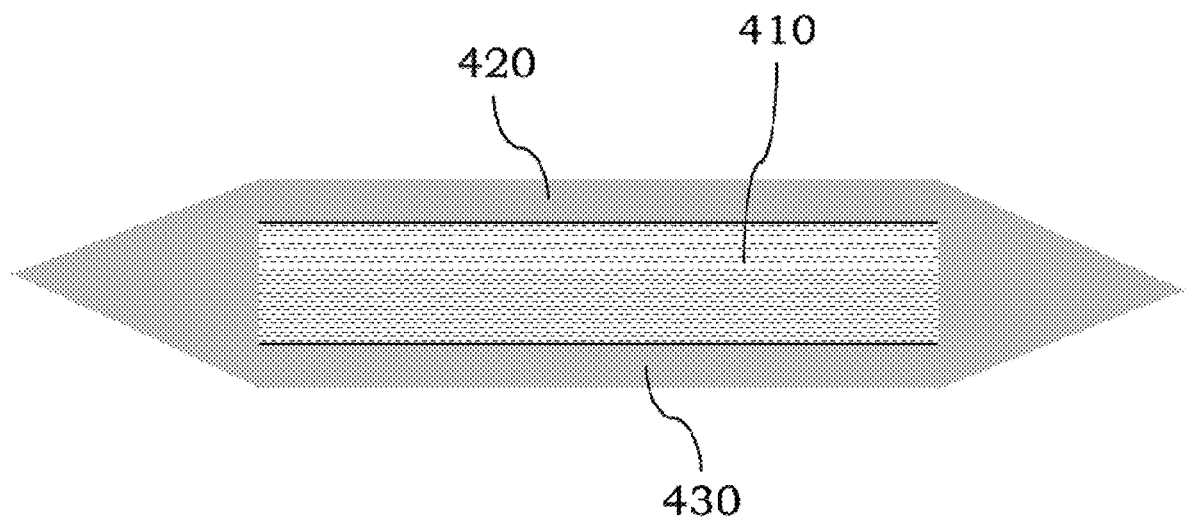
FIG. 4 is an illustration of a composite article that has been sealed to protect an underlying core layer from exposure to an oxidizing agent, in accordance with some examples.

In some embodiments, the flame retardant thermoplastic fiber-reinforced porous core comprises a web formed from the reinforcing fibers held in place by the thermoplastic material, and wherein the porous core comprises a coating on a first surface to prevent the oxidizing agent from diffusing into the porous core. In other examples, the flame retardant thermoplastic fiber-reinforced porous core comprises a web formed from the reinforcing fibers held in place by the thermoplastic material and wherein the porous core is sealed at each surface to prevent the oxidizing agent from diffusing into the porous core. For example and referring to FIG. 4, an illustration is shown where a core layer 410 is shown as being sealed between two skins 420, 430. The skins 420, 430 can be selected so there are substantially impermeable to gases and/or liquids. This configuration can prevent oxidizing agents from reaching the underlying core layer 410 to alter its color.

In some embodiments, a thermoplastic material of the flame retardant thermoplastic fiber-reinforced porous core comprises a polyolefin. In certain instances, the polyolefin comprises polypropylene. In other examples, the antioxidant is a phenolic antioxidant. In some embodiments, reinforcing fibers of the thermoplastic fiber-reinforced porous core comprises glass fibers. In some embodiments, the flame retardant comprises magnesium hydroxide, aluminum hydroxide or both, wherein the second thermoplastic material comprises a polyolefin and wherein the flame retardant thermoplastic fiber-reinforced porous core meets ASTM E84, Class A specification.

In some examples, a method of altering the color of a flame retardant thermoplastic fiber-reinforced porous core comprises comprising forming the flame retardant thermoplastic fiber-reinforced porous core by combining reinforcing fibers, a first thermoplastic material and a compounded material comprising a flame retardant, an antioxidant and a second thermoplastic material to form a web. The formed web can be exposed to an environment comprising an oxidizing agent to alter the color of the antioxidant in the flame retardant thermoplastic fiber-reinforced porous core layer from a first color to a second color. In some instances, the web is exposed to the environment comprising the oxidizing agent prior to compressing of the web. In other examples, the web is exposed to the environment comprising the oxidizing agent after compressing of the web. In some examples, the web is exposed to the environment comprising greater than 2 ppm oxidizing agent prior to disposing a skin on the web. In other examples, the web is exposed to the environment comprising greater than 2 ppm oxidizing agent after disposing a porous skin on the web. In some examples, the first thermoplastic material of the flame retardant thermoplastic fiber-reinforced porous core comprises a polyolefin. In other examples, the polyolefin comprises polypropylene. In further examples, the antioxidant is a phenolic antioxidant. In additional examples, reinforcing fibers of the thermoplastic fiber-reinforced porous core comprises glass fibers. In some embodiments, the flame retardant comprises magnesium hydroxide, aluminum hydroxide or both, wherein the second thermoplastic material comprises a polyolefin and wherein the flame retardant thermoplastic fiber-reinforced porous core meets ASTM E84, Class A specification.

In other embodiments, a method of preventing color change of a flame retardant thermoplastic fiber-reinforced porous core upon exposure to an environment comprising an oxidizing agent comprises producing the flame retardant thermoplastic fiber-reinforced porous core by combining reinforcing fibers, a flame retardant and a thermoplastic material to form a web comprising the reinforcing fibers held in place by the thermoplastic material, wherein the thermoplastic material is substantially free of an antioxidant that changes from a first color to a second color upon exposure to the environment comprising the oxidizing agent. In some examples, the thermoplastic material is substantially free of phenolic antioxidants but optionally can include non-phenolic antioxidants. In some embodiments, the thermoplastic material consists essentially of or consists of a polyolefin, e.g., polypropylene or polyethylene. In certain embodiments, the flame retardant thermoplastic fiber-reinforced porous core layer is stored in the environment comprising the oxidizing agent for at least 24 hours without changing from the first color to the second color. In other examples, the thermoplastic material comprises a polyolefin. In some embodiments, the reinforcing fibers comprise glass fibers and the polyolefin comprises polypropylene. In other examples, the flame retardant comprises magnesium hydroxide, aluminum hydroxide or both and wherein the flame retardant thermoplastic fiber-reinforced porous core meets ASTM E84, Class A specification.

In other examples, a method of reducing color change of a flame retardant thermoplastic fiber-reinforced porous core comprises producing the flame retardant thermoplastic fiber-reinforced porous core by combining reinforcing fibers, a flame retardant and a thermoplastic material to form a web comprising the reinforcing fibers held in place by the thermoplastic material, wherein the thermoplastic material comprises an antioxidant that changes from a first color to a second color upon exposure to an environment comprising oxidizing agent present at a first concentration. The antioxidant can also change from the second color back to the first color upon exposure to an environment comprising oxidizing agent present at a second concentration lower than the first concentration. The flame retardant thermoplastic fiber-reinforced porous core can be stored in the environment comprising oxidizing agent present at or below the second concentration to maintain the flame retardant thermoplastic fiber-reinforced porous core at the first color. In some examples, the antioxidant comprises a phenolic antioxidant though non-phenolic anti-oxidants may also be present. In some embodiments, the thermoplastic material consists essentially of or consists of a polyolefin, e.g., is polypropylene or polyethylene. In certain embodiments, the method comprises storing the flame retardant thermoplastic fiber-reinforced porous core layer in the environment comprising the oxidizing agent, e.g., $NO_X$, present at the first concentration for at least 24 hours to turn the antioxidant from the first color to the second color. In other examples, the method comprises removing the flame retardant thermoplastic fiber-reinforced porous core layer from the environment comprising the oxidizing agent present at the first concentration and storing the flame retardant thermoplastic fiber-reinforced porous core layer in the environment comprising the oxidizing agent at or below the second concentration to turn the antioxidant from the second color to the first color. In other instances, the thermoplastic material comprises polypropylene and the reinforcing fibers comprise glass fibers. In certain examples, the flame retardant comprises magnesium hydroxide, aluminum hydroxide or both and wherein the flame retardant thermoplastic fiber-reinforced porous core meets ASTM E84, Class A specification.

In another embodiment, a method of preventing a color change of a flame retardant thermoplastic fiber-reinforced porous core comprising an antioxidant comprises shielding the flame retardant thermoplastic fiber-reinforced porous core from exposure to oxidizing agent in an environment surrounding the flame retardant thermoplastic fiber-reinforced porous core to prevent the antioxidant from changing from a first color to a second color upon exposure to the environment comprising the oxidizing agent. In some examples, the shielding comprises wrapping the flame retardant thermoplastic fiber-reinforced porous core with a material to prevent the oxidizing agent from reacting with the antioxidant in the flame retardant thermoplastic fiber-reinforced porous core. In other embodiments, the shielding comprises packaging the flame retardant thermoplastic fiber-reinforced porous core in a substantially air tight container to prevent the oxidizing agent from reacting with the antioxidant in the flame retardant thermoplastic fiber-reinforced porous core. In some examples, the flame retardant thermoplastic fiber-reinforced porous core comprises a web formed from the reinforcing fibers held in place by the thermoplastic material, and wherein the porous core comprises a coating on a first surface to prevent the oxidizing agent from diffusing into the porous core. In additional examples, the flame retardant thermoplastic fiber-reinforced porous core comprises a web formed from the reinforcing fibers held in place by the thermoplastic material and wherein the porous core is sealed at each surface to prevent the oxidizing agent from diffusing into the porous core. In other examples, a thermoplastic material of the flame retardant thermoplastic fiber-reinforced porous core comprises a polyolefin, e.g., polypropylene or polyethylene. In certain instances, the antioxidant is a phenolic antioxidant though non-phenolic antioxidants may also be present. In some examples, reinforcing fibers of the thermoplastic fiber-reinforced porous core comprises glass fibers. In other examples, the flame retardant comprises magnesium hydroxide, aluminum hydroxide or both and wherein the flame retardant thermoplastic fiber-reinforced porous core meets ASTM E84, Class A specification.

In certain examples, a method of altering the color of a flame retardant thermoplastic fiber-reinforced porous core comprises forming the flame retardant thermoplastic fiber-reinforced porous core by combining the reinforcing fibers, flame retardant and the thermoplastic material to form a web, and exposing the formed web to an environment comprising oxidizing agent to alter the color of an antioxidant in the flame retardant thermoplastic fiber-reinforced porous core layer from a first color to a second color. In some instances, the web is exposed to the environment comprising the oxidizing agent prior to compressing of the web. In other examples, the web is exposed to the environment comprising the oxidizing agent after compressing of the web. In further embodiments, the web is exposed to the environment comprising greater than 2 ppm oxidizing agent prior to disposing a skin on the web. In additional examples, the web is exposed to the environment comprising greater than 2 ppm oxidizing agent after disposing a porous skin on the web. In some examples, thermoplastic material of the flame retardant thermoplastic fiber-reinforced porous core comprises a polyolefin, e.g., polypropylene or polyethylene. In other examples, the antioxidant is a phenolic antioxidant though non-phenolic antioxidants may also be present. In some examples, reinforcing fibers of the thermoplastic fiber-reinforced porous core comprises glass fibers. In other examples, the flame retardant comprises magnesium hydroxide, aluminum hydroxide or both and wherein the flame retardant thermoplastic fiber-reinforced porous core meets ASTM E84, Class A specification.

In some examples, to determine a color change for a composite article a colorimetry test method similar to Test Method AATCC 23 dated 2015 can be performed. In particular, a 1.5 inch by 4 inch specimen can be exposed to atmospheric oxides of nitrogen as derived from combustion of natural gas. This process results in a $NO_x$ concentration of 2 ppm or more. The test can be performed at a temperature of 60 degrees Celsius, a relative humidity of 60-65% and an exposure time of 72 hours. A fading control fabric (which does not change color under the testing conditions) can be used as a reference to compare the color change of the flame retardant thermoplastic composite article. A colorimeter can then be used to measure a color difference between the control and samples. The colorimeter output is converted into values of "L", "a" and "b." "L" measures the lightness and varies from 100 (white) to 0 (black). The "a" value measures redness (a positive value), gray/neutral (a 0 value) or greenness (a negative value). The "b" value measures yellowness (a positive value), gray/neutral (a 0 value) and blueness (a negative value). A ColorFlex Colorimeter (Hunter Labs) can be used to measure the colors. The overall color difference or discoloration ($\Delta E$) is calculated as the vector difference between the two points in the color solid according to the following equation:

$$\Delta E = \sqrt{(L_o - L_1)^2 + (a_o - a_1)^2 - (b_o - b_1)^2}$$

where $L_o$, $a_o$, $b_o$ are values at the first point and $L_1$, $a_1$ and $b_1$ are values at the second point.

In some instances, the composite materials described herein can be used as an ex-situ sensor for the presence of oxidants or oxidizing agents. For example, a strip of the material can be placed in an environment and monitored for a color change. The sensor may not per se be a real-time sensor but can be used to monitor the long term presence of oxidizing agents, e.g., $NO_x$ or other species, present in the atmosphere. The simple and cheap nature of the strip sensor permits its use in a wide range of applications where electronic sensors may not be suitable.

Certain specific examples are described to illustrate further some of the novel and inventive aspects of the technology described herein.

Example 1

Several test core layers were prepared to determine if a color change results when a compounded flame retardant material comprising a metal hydroxide flame retardant (MDH), polypropylene (PP) and a phenolic antioxidant were present in a core layer. The weight percentages of the materials in the samples are provided below in Table 1. The compounded material included about 70% by weight MDH. Glass fibers and polypropylene resin were used along with the compounded flame retardant materials in a wet lay process to form the core layers.

TABLE 1

| Sample | Target MDH Loading | Basis Weight (gsm) | Thickness (mm) | Ash Content (%) | Density (g/cm$^3$) |
|---|---|---|---|---|---|
| ST-13061A | 25% | 1104 ± 5.6 | 3.31 ± 0.05 | 60.7 | 0.33 |
| ST-13061B | 25% | 1031 ± 18.0 | 3.25 ± 0.11 | 61.0 | 0.32 |
| ST-13061C | 20% | 1043 ± 11.1 | 3.34 ± 0.07 | 60.0 | 0.31 |

The flame retardancy of the produced core layers was measured according to the ASTM E84 protocol. The results for flame spread index (FSI) and smoke density index (SDI) are shown below in Table 2. All core layers met the Class A, E84 standard as the FSI values were 25 or below.

TABLE 2

| Sample | FSI | SDI |
|---|---|---|
| ST-13061A | 20 | 250 |
| ST-13061B | 25 | 85 |
| ST-13061C | 25 | 140 |

The discoloration of each core layer was measured according to Test Method AATCC 23 dated 2015. The results after different exposure periods of 24 hours, 48 hours, 72 hours, 96 hours and 120 hours are shown below in Table 3.

TABLE 3

| | Delta E | | | | |
|---|---|---|---|---|---|
| Sample | 24 h | 48 h | 72 h | 96 h | 120 h |
| ST-13061A | 3.7 | 4.9 | 5.3 | 5.7 | 5.3 |
| ST-13061B | 3.3 | 4.2 | 4.6 | 6.3 | 5.9 |
| ST-13061C | 3.1 | 3.8 | 4.8 | 6.0 | 5.8 |

The discoloration results demonstrate that pinking of the core layers increases over time and stabilizes after at about 96 hours of environmental exposure.

Example 2

Core layers were prepared from a compounded flame retardant material that lacked any phenolic antioxidants. The weight percentages of the materials in the samples are provided below in Table 4. The compounded material included about 70% by weight MDH and did not include any phenolic antioxidants. Glass fibers and polypropylene resin were used along with the compounded flame retardant materials in a wet lay process to form the core layers.

TABLE 4

| Sample | Target MDH Loading | Basis Weight (gsm) | Thickness (mm) | Ash Content (%) | Density (g/cm$^3$) |
|---|---|---|---|---|---|
| PL0263-1 | 30% | 1050 | 3.2 | 60.6 | 0.33 |
| PL0263-2 | 25% | 1050 | 3.2 | 60.6 | 0.33 |
| PL0263-3 | 20% | 1050 | 3.2 | 60.6 | 0.33 |

The flame retardancy of the produced core layers was measured according to the ASTM E84 protocol. The results for flame spread index (FSI) and smoke density index (SDI) are shown below in Table 2.

The flame retardancy of the produced core layers was measured according to the ASTM E84 protocol for one of the core layers. The results for flame spread index (FSI) and smoke density index (SDI) are shown below in Table 5.

TABLE 5

| Sample | FSI | SDI |
|---|---|---|
| PL0263-2 | 25 | 200 |

The E84 testing of the PL0263-2 sample is consistent with the core layer still meeting Class A E84 performance standards.

The discoloration of the PL0263-2 core layer was measured according to Test Method AATCC 23 dated 2015. A Delta E value of 3.8 was obtained after exposure of the core layer to the environment for 72 hours. This value is similar to the control sample values at 24 hour or less exposure time. The results are also consistent with removal of the antioxidant from the compound flame retardant material avoiding pinking.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A method comprising producing a flame retardant thermoplastic fiber-reinforced porous core by combining reinforcing fibers, a first thermoplastic polyolefin material and a compounded material comprising a flame retardant compounded with a second thermoplastic polyolefin material, wherein the flame retardant thermoplastic fiber-reinforced porous core comprises a web formed from the reinforcing fibers held in place by the first thermoplastic material and the second thermoplastic material, wherein the compounded material comprises an antioxidant that turns from a first color to a second color upon exposure to an environment comprising oxidizing agent present at a first concentration, and wherein the antioxidant turns from the second color back to the first color upon exposure to an environment comprising oxidizing agent present at a second concentration lower than the first concentration, and wherein the flame retardant thermoplastic fiber-reinforced porous core is stored in the environment comprising oxidizing agent present at or below the second concentration to maintain the flame retardant thermoplastic fiber-reinforced porous core at the first color.

2. The method of claim 1, wherein the antioxidant comprises a phenolic antioxidant.

3. The method of claim 1, wherein the first thermoplastic polyolefin material is polypropylene.

4. The method of claim 1, wherein the first thermoplastic polyolefin material is polyethylene.

5. The method of claim 1, wherein the first thermoplastic polyolefin material consists of polypropylene.

6. The method of claim 5, wherein the second thermoplastic polyolefin material is polypropylene.

7. A method comprising:
producing a flame retardant thermoplastic fiber-reinforced porous core by combining reinforcing fibers, a first thermoplastic material and a compounded material comprising a flame retardant compounded with a second thermoplastic material, wherein the flame retardant thermoplastic fiber-reinforced porous core comprises a web formed from the reinforcing fibers held in place by the first thermoplastic material and the second thermoplastic material, wherein the compounded material comprises an antioxidant that turns from a first color to a second color upon exposure to an environment comprising oxidizing agent present at a first concentration, and wherein the antioxidant turns from the second color back to the first color upon exposure to an environment comprising oxidizing agent present at a second concentration lower than the first concentration, wherein the flame retardant thermoplastic fiber-reinforced porous core is stored in the environment comprising oxidizing agent present at or below the second concentration to maintain the flame retardant thermoplastic fiber-reinforced porous core at the first color; and storing the produced flame retardant thermoplastic fiber-reinforced porous core layer in the environment comprising $NO_X$ present at the first concentration for at least 24 hours to turn the antioxidant in the flame retardant thermoplastic fiber-reinforced porous core from the first color to the second color.

8. The method of claim 7, further comprising removing the flame retardant thermoplastic fiber-reinforced porous core layer from the environment comprising $NO_X$ present at the first concentration and storing the flame retardant thermoplastic fiber-reinforced porous core layer in the environment comprising $NO_X$ at or below the second concentration to turn the antioxidant in the flame retardant thermoplastic fiber-reinforced porous core from the second color to the first color.

9. The method of claim 1, wherein the first thermoplastic polyolefin material comprises polypropylene and the reinforcing fibers comprise glass fibers.

10. The method of claim 9, wherein the flame retardant comprises magnesium hydroxide, aluminum hydroxide or both, wherein the second thermoplastic polyolefin material comprises polypropylene and wherein the flame retardant thermoplastic fiber-reinforced porous core meets ASTM E84, Class A specification.

* * * * *